(12) United States Patent
Evans et al.

(10) Patent No.: US 9,210,913 B2
(45) Date of Patent: Dec. 15, 2015

(54) BIRD FEEDER

(71) Applicants: Graham Charles Evans, Hoath (GB);
Matthew John Wood, Herne Bay (GB)

(72) Inventors: Graham Charles Evans, Hoath (GB);
Matthew John Wood, Herne Bay (GB)

(73) Assignee: Graham Charles Evans, Cantebury (GB)

( * ) Notice: Subject to any disclaimer, the term of this patent is extended or adjusted under 35 U.S.C. 154(b) by 94 days.

(21) Appl. No.: 14/084,362

(22) Filed: Nov. 19, 2013

(65) Prior Publication Data

US 2015/0136031 A1    May 21, 2015

(51) Int. Cl.
*A01K 39/01* (2006.01)
*A01K 39/012* (2006.01)

(52) U.S. Cl.
CPC .................................. *A01K 39/012* (2013.01)

(58) Field of Classification Search
CPC ... A01K 39/01; A01K 39/00; A01K 39/0113; A01K 39/012; A01K 31/06; A01K 31/07; A01K 31/08; A01K 31/12; B65D 25/32; B65F 1/1615; A47J 45/075; A47J 47/18; A47J 45/065
USPC ......... 119/51.01, 52.1, 52.2, 52.3, 57.8, 57.9, 119/428–435, 459–471, 496–499; D30/124, 127, 128; 220/212, 212.5, 220/318, 775, 776, 773, 759, 756, 760, 770
See application file for complete search history.

(56) References Cited

U.S. PATENT DOCUMENTS

| | | | |
|---|---|---|---|
| 2,884,899 A | 5/1959 | Jackes et al. | |
| 4,355,597 A * | 10/1982 | Blasbalg | 119/57.8 |
| D282,019 S * | 12/1985 | Kilham | D30/127 |
| 4,632,061 A | 12/1986 | Tucker et al. | |
| 5,044,319 A | 9/1991 | Blasbalg | |
| 5,062,388 A * | 11/1991 | Kilham | 119/52.2 |
| 5,063,877 A | 11/1991 | Riggi | |
| 5,215,039 A * | 6/1993 | Bescherer | 119/57.8 |
| 5,360,138 A | 11/1994 | Zeller | |
| D385,067 S * | 10/1997 | Whittles | D30/124 |
| 5,701,842 A * | 12/1997 | Whittles | 119/52.2 |
| 5,709,165 A | 1/1998 | Nurmikko | |
| 6,024,049 A | 2/2000 | Price | |

(Continued)

FOREIGN PATENT DOCUMENTS

| | | |
|---|---|---|
| GB | 2 442 815 A | 4/2008 |
| GB | 2 451 062 A | 1/2009 |
| GB | 2 452 194 A | 2/2009 |

OTHER PUBLICATIONS

GB 1220917.7, "Further Search Under Section 17", dated Feb. 27, 2014.

*Primary Examiner* — Trinh Nguyen
(74) *Attorney, Agent, or Firm* — Fay Sharpe LLP (57) ABSTRACT

A bird feeder includes a tubular container for bird food and a removable base engageable with projections at a lower end thereof to retain it in place to form the bottom of the container. The base has an upper part in the form of a plug insertable into the container and a lower part having an annular outer part on which the upper part can rotate, and includes locking mechanism projections selectively locked into slots in the upper part by rotation. The projections can be disengaged from the slots in a first rotational position and are locked into the slots in a second rotational position, respectively. The upper and lower parts of the base can be separated from one another with a relative rotation between a first, locked position and a third, disengaged.

18 Claims, 8 Drawing Sheets

(56) References Cited

U.S. PATENT DOCUMENTS

| | | |
|---|---|---|
| 6,158,385 A | 12/2000 | Boyd |
| 6,360,690 B1 | 3/2002 | Canby |
| 6,543,383 B1 * | 4/2003 | Cote .......................... 119/57.8 |
| 6,863,024 B1 | 3/2005 | Obenshain |
| 7,237,507 B1 * | 7/2007 | Colwell ..................... 119/51.01 |
| 7,448,346 B1 | 11/2008 | Stone et al. |
| 7,516,716 B2 * | 4/2009 | Puckett et al. ................ 119/432 |
| 7,827,936 B1 | 11/2010 | Puckett et al. |
| 2001/0032592 A1 | 10/2001 | Bescherer |
| 2003/0150391 A1 | 8/2003 | Rich |
| 2004/0031443 A1 * | 2/2004 | Ela et al. ..................... 119/57.9 |
| 2007/0006809 A1 * | 1/2007 | Bradeen .................... 119/51.03 |
| 2007/0163506 A1 * | 7/2007 | Bloedorn .................... 119/52.2 |
| 2007/0266950 A1 | 11/2007 | Walsh |
| 2012/0234249 A1 * | 9/2012 | Gaze .......................... 119/57.8 |

\* cited by examiner

BIRD FEEDER

This invention relates to a feeder for wild birds of the type comprising a container for bird food having one or more ports in a wall of the container through which birds may access the contents.

Bird feeders typically comprise a tubular container, usually cylindrical in shape, having a number of apertures in the cylindrical wall, each of which has secured therein a food port with a perch projecting radially outwardly from its lower end. The food port and perch are usually formed integrally and the port normally has a hood projecting radially inwardly from its upper edge to prevent bird food from simply falling out through the port.

Some typical bird feeders are illustrated in GB-A-2451062, GB-A-2442815 and GB-A-2452194. In designing a bird feeder of this type, it is advantageous for the feeder to comprise as few parts as possible, both for simplicity and for ease of cleaning. The feeders should furthermore be easy to assemble and disassemble.

Bird feeders of the type described above may have a removable base with a central portion engaging the bottom of the tubular feeder. The feeder typically has a pair of radially inwardly directed projections arranged opposite one another in the inner surface of the tubular container to engage the base, and a locking mechanism in the base, operable from below. The base of this sort is disclosed for example in GB-A-2452194. Such mechanisms can however be complicated, and because the base has apertures with which to engage the projections on the inside of the container bird food may get inside the mechanism and be difficult to remove.

The present invention provides a bird feeder having a tubular container for bird food and a removable base engageable with projections at a lower end of the container, the base comprising an upper part shaped and dimensioned to close the lower end of the container and having a plurality of slots, usually two, in which said projections engage when the upper part and the container are fitted together, and a lower part engageable with the upper part and including a locking mechanism whereby the projections can be locked into said slots by rotation of the lower part of the base relative to the upper part, between a first rotational position in which the projections can be disengaged from the slots and a second rotational position in which the projections are locked into the slots. The feeder is characterized in that upper and lower parts of the base can be separated from one another with a relative rotation of said upper and lower parts between said first position, in which the two parts are locked together and a third position in which they are disengaged.

The container is preferably cylindrical in shape, with apertures in its cylindrical wall in which ports and perches can be mounted to enable birds to access food in the container.

The upper part of the base is preferably in the form of a plug whose outer periphery matches the inner periphery of the container. The top surface of the upper part preferably constitutes a floor of the container and may comprise a pair of surfaces sloping downwardly on either side of a diameter of the plug.

The slots to engage the projections inside the container are preferably located in a hollow region of the plug and comprise a top part formed in a top surface of the plug and extending radially inwardly from an upper peripheral edge of the plug and a bottom part formed in a peripheral wall of the plug and extending downwardly from the said upper peripheral edge, whereby a projection may enter the slot from above and be locked into position at the bottom of the slot by a flange of the lower part of the base moving into a position above the projection as the upper and lower parts rotate relative to one another.

The parts of the base are preferably made from rigid but resilient material, suitably a plastics material such as nylon or polypropylene. A metal such as steel or aluminium may also be used, particularly for the lower base part. The first, second and third rotational positions of the upper and lower parts of the base are preferably each indicated by a resilient projection on one of said parts engaging a snap-fit in respective recesses on the other said part.

A further aspect of the invention relates to interlocking port members engaged in apertures in the tubular wall of the container.

GB-A-2451062 discloses a bird feeder in which pairs of units each comprising a port and a perch are inserted into diametrically opposed apertures in the cylindrical wall of a container of a bird feeder, the port members having radially inwardly projecting parts which interlock on the central axis of a container and are then held in position by an axial pin which can be inserted from above to pass through an aligned hole of the respective interlocking parts to hold them together and thus hold them in position on the container wall. One port member of each pair has its axial hole formed in a male projection while the other has a pair of such axial holes formed on either side of a female recess which receives the male projection of the opposing member so that their respective holes align. This arrangement has two possible disadvantages. First, when the central pin is withdrawn, the two port members may sag and remain engaged with one another rather than neatly disengaging from the container, and there is the inherent disadvantage of having to make two different types of port member, male and female. It would therefore be advantageous if port members of each pair were of the same shape and if there were no form locking between them following removal of the central pin.

According to a further aspect of the invention, there is provided a bird feeder having a tubular container with at least one pair of diametrically opposed apertures in its tubular wall and a pair of feeding port members shaped and dimensioned to fit in said apertures and to engage one another in a central part of the container to define an aperture for a retaining pin to hold said port members in position, wherein said port members are shaped to interlock when moved towards one another in a straight line, said interlocking being such as to prevent any twisting movement between them or any relative movement transverse to said straight line, each said port having a surface defining a straight open channel such that when the port members are in their interlocked position, said surfaces abut one another and said channels define between them a hole through which said retaining pin may be inserted to lock said port members together. Said surface on each of the port members is preferably positioned to coincide with a central plane of the port member, the channel formed therein being vertical when the port member is in position in the feeder. The surface is preferably formed on a shank extending from a main body portion of the port member, the shank having a projection extending parallel to said plane on the end of the shank remote from said main body portion. Adjacent said surface on the opposite side of said central plane is a recess in the main body portion, so that when the two port members interlock the projection on one port member is received in the corresponding recess of the other. With this arrangement, the two port members may be made identical.

The main body portion of each port member preferably comprises an inner part shaped and dimensioned to fit snugly within the aperture in the container wall, with a feed port formed through it to provide access to food in the container and an outer part integral with the inner part, larger than said aperture and having an inner surface whose shape corresponds to that of the container wall. The port member preferably has a perch positioned below the access aperture.

On said inner surface of the outer part of the port member there may be provided a radially inward projection to fit through a corresponding hole at the bottom of the container wall, to engage the container base.

A further aspect of the invention relates to a lid and handle for the bird feeder. Many bird feeders, such as that disclosed in GB-A-2452194, have a wire handle engaged through apertures formed at opposite ends of a support bar that passes diametrically through an upper part of the container so that the handle can pivot relative to the container. The container also has a lid with apertures on opposite sides thereof through which the wire handle passes, so that the lid can be raised and lowered to fill or empty the container and is retained by the handle to prevent loss. One disadvantage of this arrangement is that ends of the wire handle have to be bent after insertion through the apertures in the support to retain it in position. This complicates assembly of the feeder.

According to this aspect, the present invention provides a handle and lid combination for a container, comprising a handle with two parallel lengths of resilient material connected together at their upper ends, their lower ends being bent at right angles to align with one another on a common axis and a lid with upper and lower sides and two vertical bores formed therethrough on opposite sides of the lid and respective horizontal bores in said lid, each intersecting one of said vertical bores at right angles and said horizontal bores being coaxially aligned with one another, wherein the upper part of each vertical bore, above its junction with the horizontal bore, also extends radially outwardly to the periphery of the lid and the lower part of each bore, below its junction with the horizontal bore, opens radially inwardly to the inside of the lid, whereby the resilient legs of the handle may be pulled apart to enable the turned in portions to enter the respective horizontal bores on opposite side of the lid and can be pushed together until the resilient legs extend within respective vertical bores, and the lower openings of the vertical bores thereafter enabling the handle to be pushed downwardly through the lid to allow the inwardly turned portions of the legs subsequently to be received in respective opposed bores in an upper part of the container to form a pivoting handle with the lid retained thereon.

The handle may be formed from a single length of wire bent into an arcuate upper end with two parallel legs, the inwardly turned lower ends of the legs extending towards each other for a distance which may suitably be 1 to 1.5 cm.

With this arrangement, the wire may be bent to the desired shape before assembly with the lid. The container of the bird feeder has a pair of diametrically opposed apertures at the upper end of its cylindrical wall, and a rigid tubular attachment may suitable be inserted to extend between said apertures, the support having short reduced diameter sections at each end to protrude through the opposed apertures and receive the ends of the bent in sections of the legs.

Preferred embodiments of the invention will now be described wherein.

Figure 1:
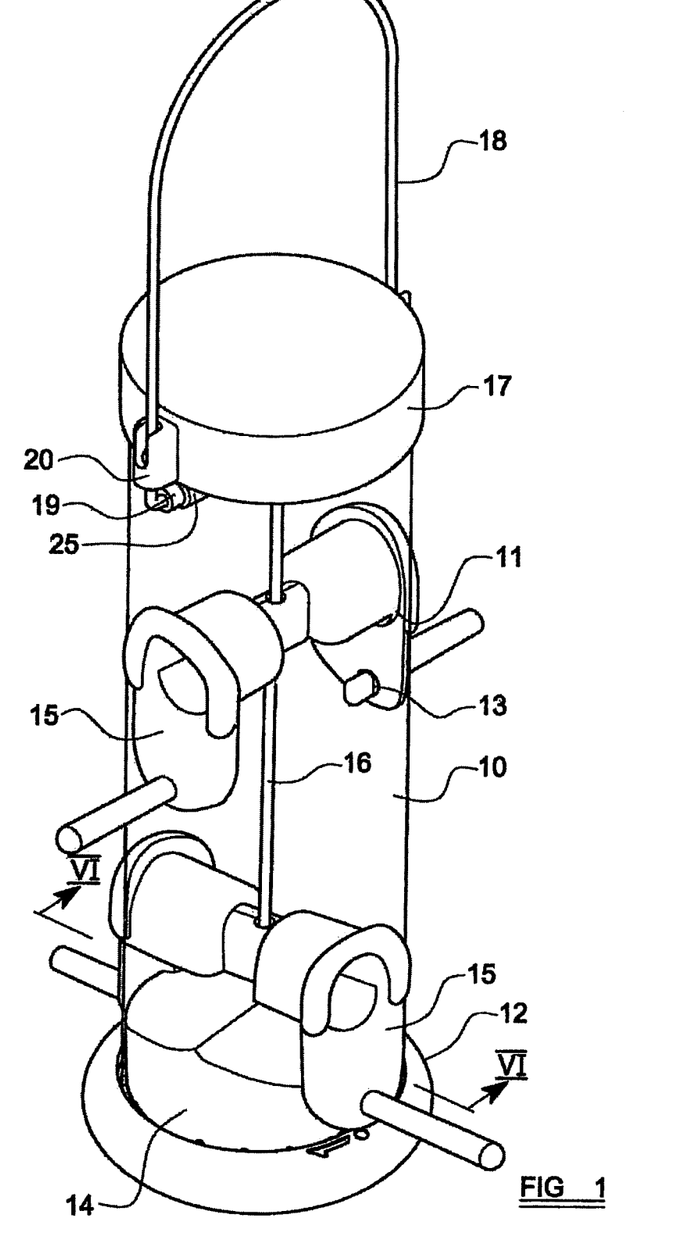
FIG. 1 is a perspective view of a bird feeder in accordance with the invention.

Referring first to FIG. 1, a bird feeder comprises a cylindrical container 10, preferably of a clear plastics material, having two pairs of diametrically opposed large apertures 11 and two pairs of diametrically opposed smaller apertures 13, positioned below respective large apertures, to receive interlocked pairs of port members 15 which will be described in more detail below. The port members are held in position by a retaining pin 16 inserted from above.

The feeder has a base comprising an upper part 14, which is in the form of circular plug having an outer diameter corresponding to the inner diameter of the container 10 and a lower part 12 interlocked with the other part. The base is held in position by engagement with an inward projection at the bottom of the two lower port members 15, as will be described in more detail below.

The feeder is also provided with a lid 17 and a handle 18 which is retained on the lid by passing through opposed lugs 20, the handle having inwardly turned lower ends engaging in axial bores of projecting bushes 19 arranged at the opposite ends of a support member 25.

Referring to FIGS. 2-5, the base 14 comprises a part cylindrical body having an upper surface divided into two halves 26 by a centre line 28, the two surfaces 26 sloping downwardly in a direction away from the centre line towards respective slots 22 which are used to lock the base on to the bottom of the container 10 as will be described in more detail below.

Figure 3:
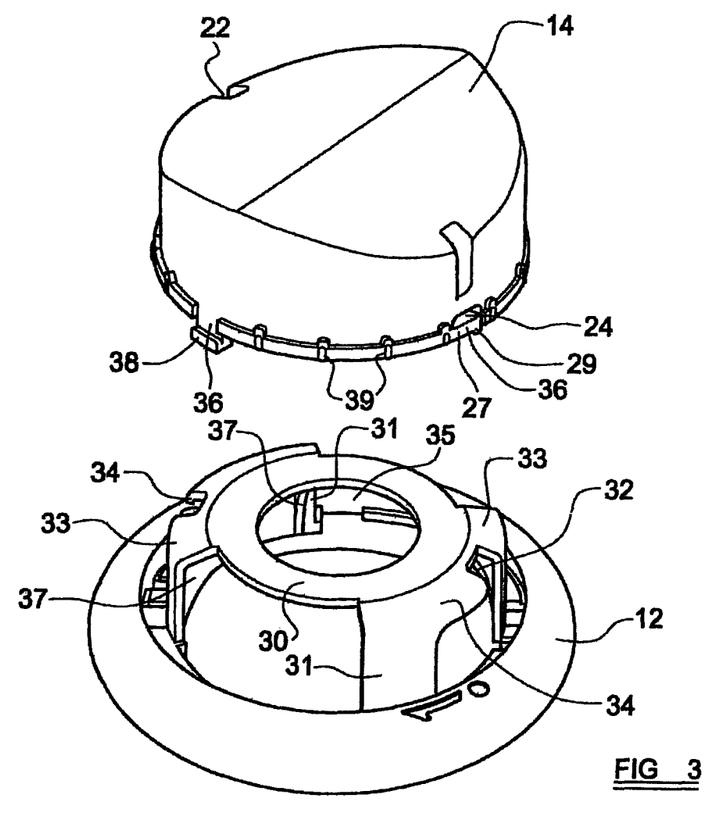
FIG. 3 is an exploded perspective view of the upper and lower parts of the base of FIG. 2.

As can be seen more clearly in FIG. 3, in which the upper and lower parts of the base are separated, the lower base part 12 comprises an outer annular body and, above and coaxial with it, a central annular member supported on two pairs of diametrically opposed legs 31, 33, under which are integral bracing webs 37. Integral with the legs 31 are lateral locking flanges 34 to engage radially inward projections the two lowermost port members 15 which pass through holes 13 in the container wall, to lock the base on to the container and said port members as will be described in more detail in relation to FIG. 6.

A downwardly projecting cylinder 50 on the underside of the upper base part 14 (see FIG. 5) fits into central aperture 35 to centre the upper part during assembly.

Figure 2:
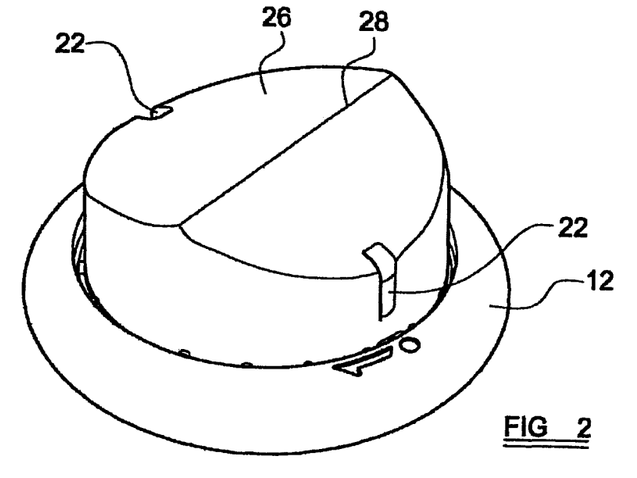
FIG. 2 is a perspective view of the base of the bird feeder of FIG. 1.

Defined between the circular inner edge of lower base part 12 and the arcuate radially outer surfaces of legs 31, 33, is a circular channel to receive the lower edge of upper base part 14. When in position as shown in FIG. 2, this lower edge is supported on a series of coplanar webs and flanges which allow limited rotation of the upper part relative to the lower part, while the lower part is locked on to the upper part by a diametrically opposed pair of resilient engaging members 36.

Figure 4:
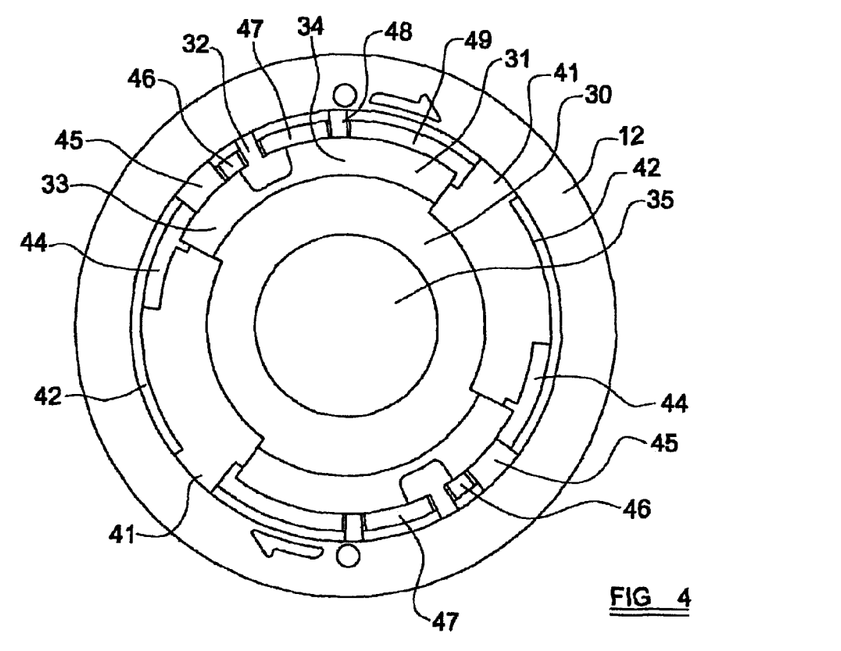
FIG. 4 is a top plan view of the lower part of the base of FIG. 3.
Figure 5:
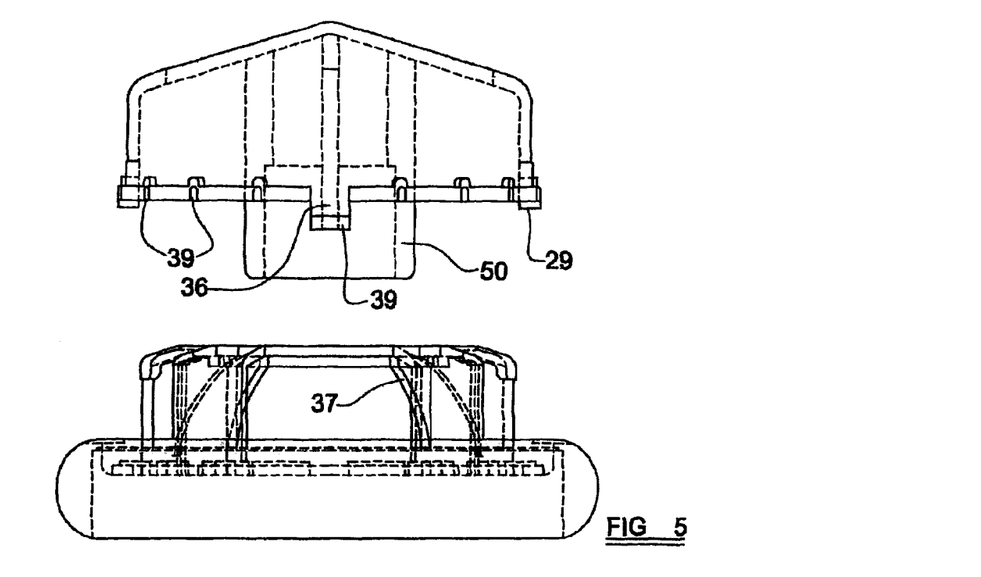
FIG. 5 is an exploded side elevation of the upper and lower part of the base of FIG. 2, with internal parts shown in broken lines.

Referring to FIG. 4, 41 designates the two diametrically opposed positions for the engaging members 36 of the upper base port when it is inserted into the lower part. Engaging members 36 extend below the annular bottom surface of the upper member and have radially outwardly directed portions 38. Working clockwise round the lower part from the spaces 41, a pair of narrow arcuate flanges 42 extend as far as respective webs 44 that connect the bottom edges of legs 33 to the outer ring. These webs 44 are wider than flanges 42, having the same outer radius but a smaller inner radius.

Continuing in a clockwise direction, beyond the webs 44 are spaces 45 followed by inwardly projecting stops then the gaps 32 between legs 33 and the locking flanges 34 descending from the tops of legs 31. Then come flanges 47, narrow gaps 48 and webs 49 which connect the bottom edges of legs 31 to the outer ring.

The bottom edge of the upper base part 14 is provided with small radially outwardly projecting nubs 39 around its periphery, to allow smooth rotation of the upper part relative to the lower part, without sticking.

Provided on the lower edge of the upper part, as best seen in FIG. 3, are a pair of resilient stop members 36, diametrically opposed and approximately coinciding with the slots 22, at an angular spacing of 90° from each of the engaging members 36. Each of these stop members comprises a resilient arm 27 with a downwardly projecting cam follower 29. There is a small cutout 24 above the stop member to allow some vertical play for the resilient arm 27.

Figure 6:
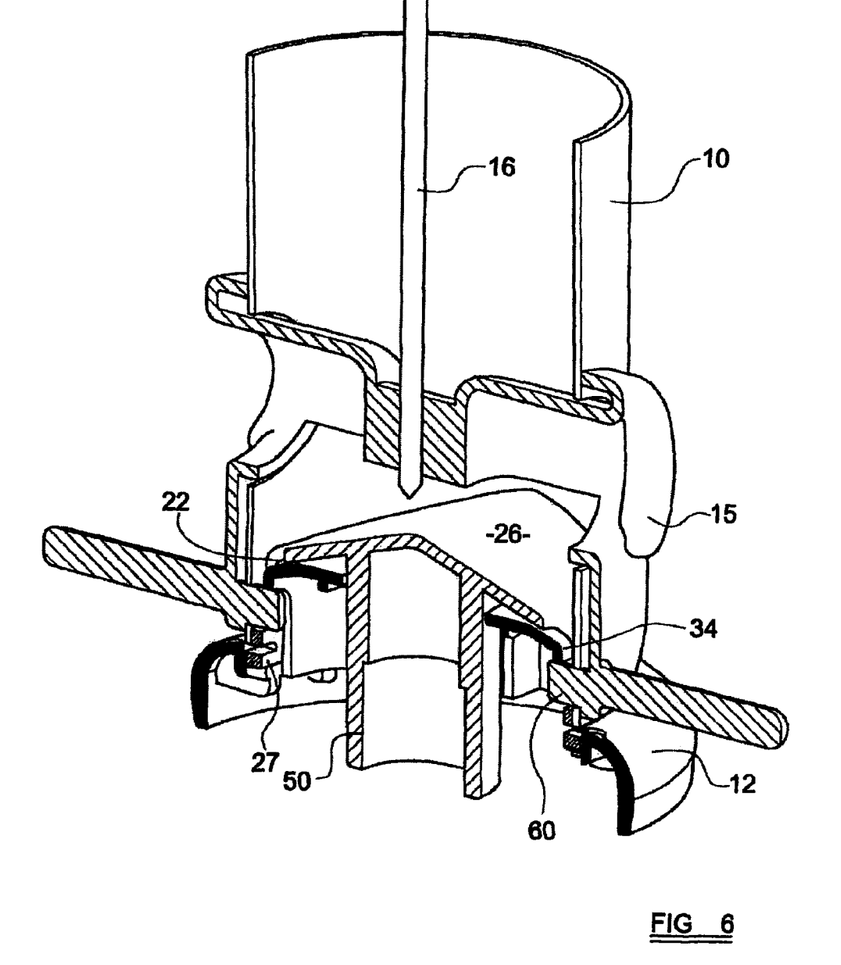
FIG. 6 is a vertical cross-section on the line VI-VI through the lower part of the bird feeder of FIG. 1.

To assemble the base, the cylinder 50 of the upper part is inserted into circular aperture 35 of the lower part to centre the upper part, which is then rotated until the engaging members 36 coincide with spaces 41. The upper part can then be pushed downwards until its circular bottom edge rests on flanges 44 and 49. At this point cam followers 29 project into gaps 45. Rotating the upper part clockwise through a few degrees causes the radial projections 38 of engaging members 36 to engage under flanges 42, while cam followers 29 ride over inward projection 46 and snap into gaps 32. The upper and lower parts are now locked together against vertical movement, and gaps 32 of the lower part are aligned with slots 22 of the upper part, to enable the base to be inserted into the bottom of the tubular container 10. With the port members 15 in position in the container, the open slots 22 of the upper base part are aligned with the radially inward projections 60 of the lowermost pair of port members 15 and pushed axially upwards into the container so that the projections 60 fit into the slots 22. The upper part of the base is thus held against rotation relative to the container. A clockwise rotation of the container and the upper base part relative to the lower base part, as seen from above in FIG. 4, causes the locking flanges 34 of the lower base part to move to a position above the projections 60 as shown in FIG. 6. At the same time the cam followers 29 ride over flanges 47 to engage in gaps 48 to retain the lower base part against accidental rotation relative to the upper base part and the container. The base is thus locked into the container.

Figure 8:
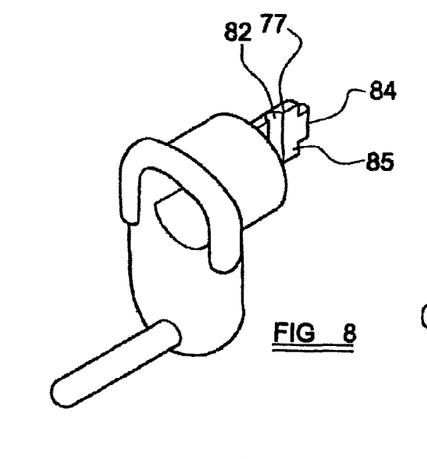
FIG. 8 is a perspective view of one of the port members.
Figure 9:
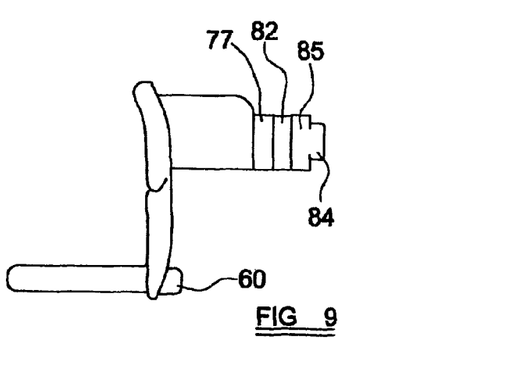
FIG. 9 is a side elevation of the port member of FIG. 8.
Figure 10:
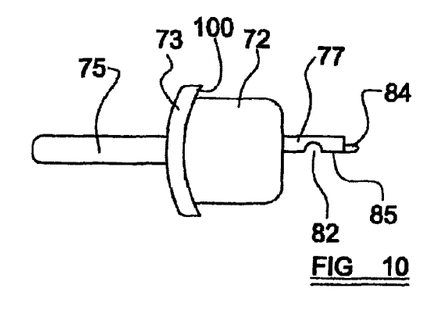
FIG. 10 is a top plan view of the port member of FIG. 8.

Referring now to FIGS. 7 to 11, FIG. 7 shows two port members 15 in the back-to-back configuration that they assume when assembled on the bird feeder of FIG. 1, defining between them a through-hole 70 for retaining pin 16. Each of the port members comprises inner housing 72 in the form of a hood with an access opening 74 and an open underside 74 to enable birds to reach the contents of the feeder. An outer part 73 has a larger area than the apertures 11 in the container wall so that this part remains on the outside of the wall when the port member is inserted. As can be seen in FIG. 10, the outer part 73 is a curved inner surface to match that of the container.

Figure 7:
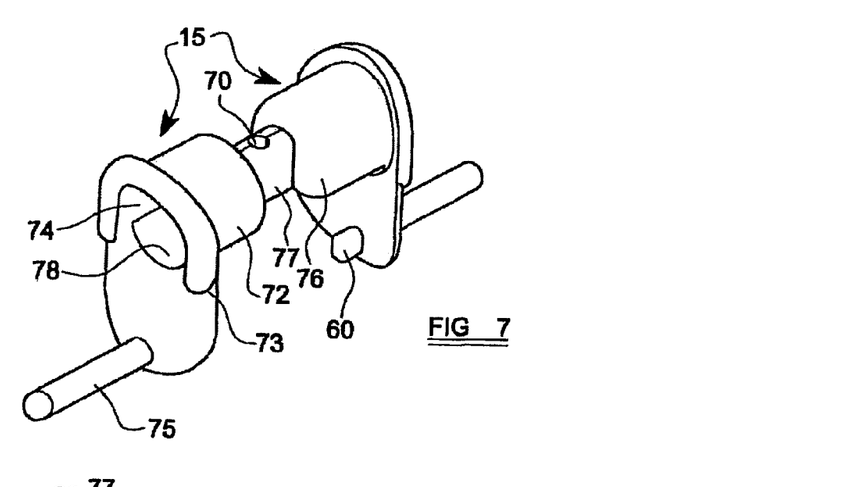
FIG. 7 is a perspective view of one of the pairs of port members of the bird feeder of FIG. 2.

The port member also has an integral perch 75 positioned just below the access opening 74.

On the inner side of the outer member is an inward projection 60, to engage a corresponding aperture 13 of the container wall. In the case of the lowermost pair of port members shown in FIG. 1, it is these projections that are engaged by the base to lock the base in position.

At the inner end of each port member is a inwardly projecting shank 77 by means of which the port members are interlocked. As can best be seen in FIGS. 8 to 10, each shank 77 has a flat surface 85 which lies in a central vertical plane of the port member. Formed in this surface is a semi-cylindrical recess 82. When the port members are assembled the respective channels 82 of the two port members align to define the cylindrical through hole 70.

At the free end of each of the shanks 77 is a small projection 84 one surface of which is an extension of surface 85.

Figure 11:
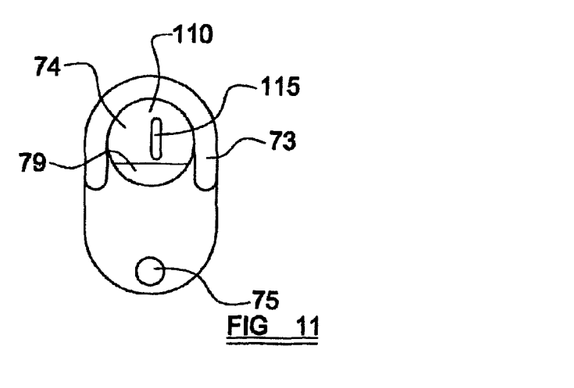
FIG. 11 is a front elevation of the port member of FIG. 8.
Figure 12:
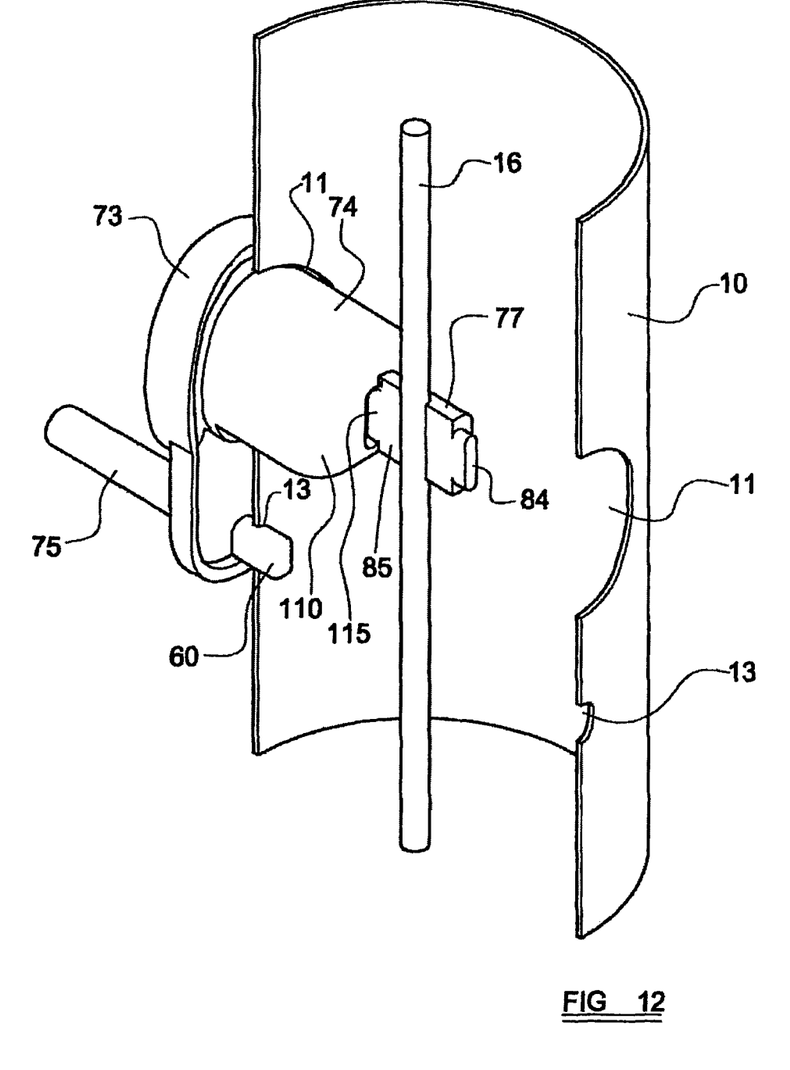
FIG. 12 shows the engagement of a retaining pin with one of the port members within the container.

As can be seen in FIG. 11, the feeding aperture 74 has and end wall 110 at its inner end. Formed in this end wall is a slot 115, positioned to one side of the central plane of the port member on the left hand side of the slot as seen in FIG. 11 being aligned with that central plane. The slot extends right through the rear wall 110 as can be seen in FIG. 12.

When the two port members are assembled together, the projection 84 of each member extends into the slot 115 of the other until the end surface of shank 77 abuts the rear wall 115, defining the position in which the two channels 82 define the through hole 70.

In the interlocked arrangement of the two port members as shown in FIG. 7, movement of the two members relative to one another is limited to the straight line along which they have been assembled together. Interlocking of the two projections 84 in respective slots 115, together with the abutment of surfaces 85, prevents any twisting movement or any movement of one port member relative to the other in any direction transverse to that straight line. Thus when the retaining pin 16 is inserted through the through hole 70 as shown in FIGS. 1 and 12, the two shanks 80 are locked together around the retaining pin and cannot be pulled apart without first removing the pin.

Figure 13:
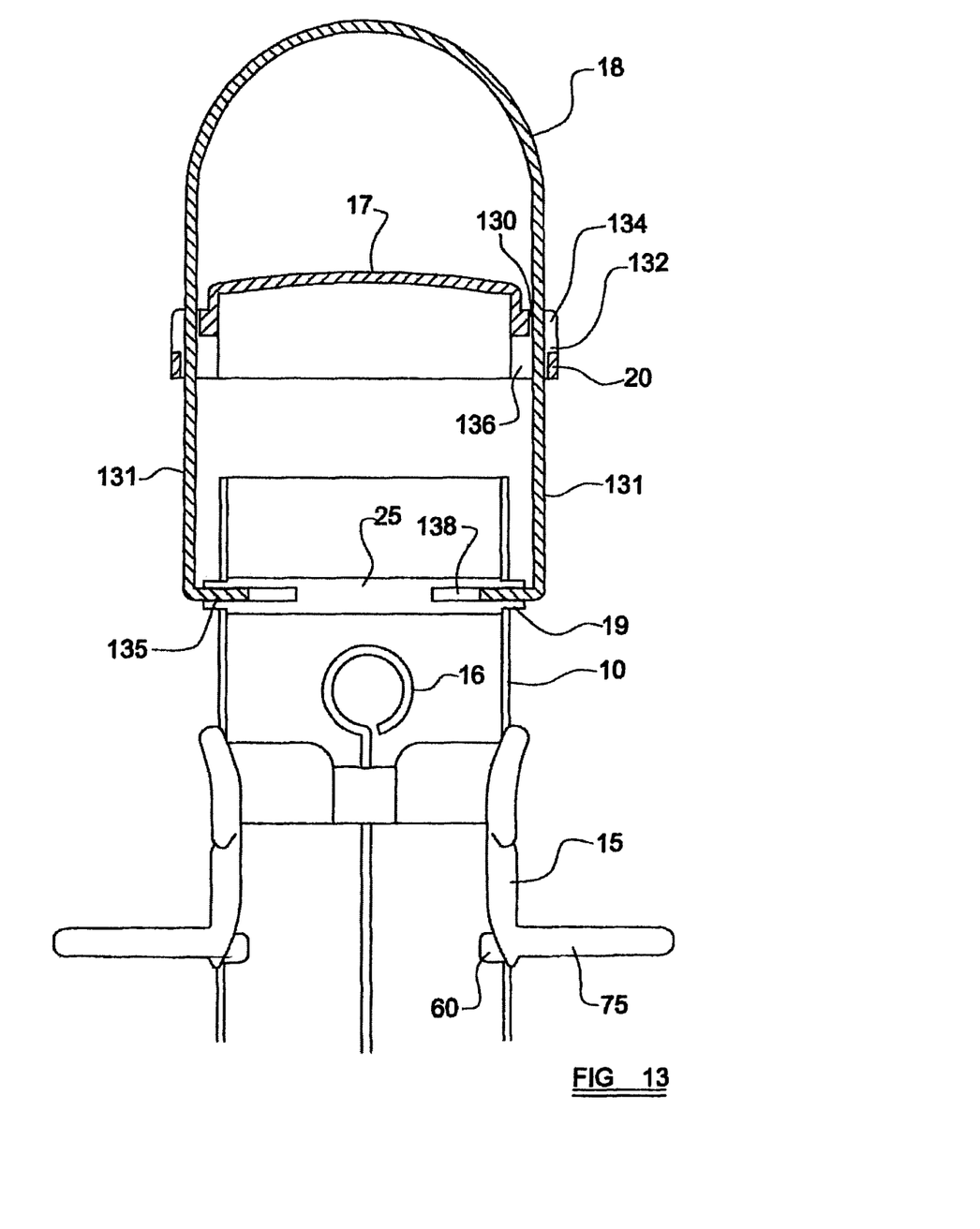
FIG. 13 is a vertical cross-sectional view through the handle and lid arrangement of the bird feeder of FIG. 1, with the lid partially raised.
Figure 14:
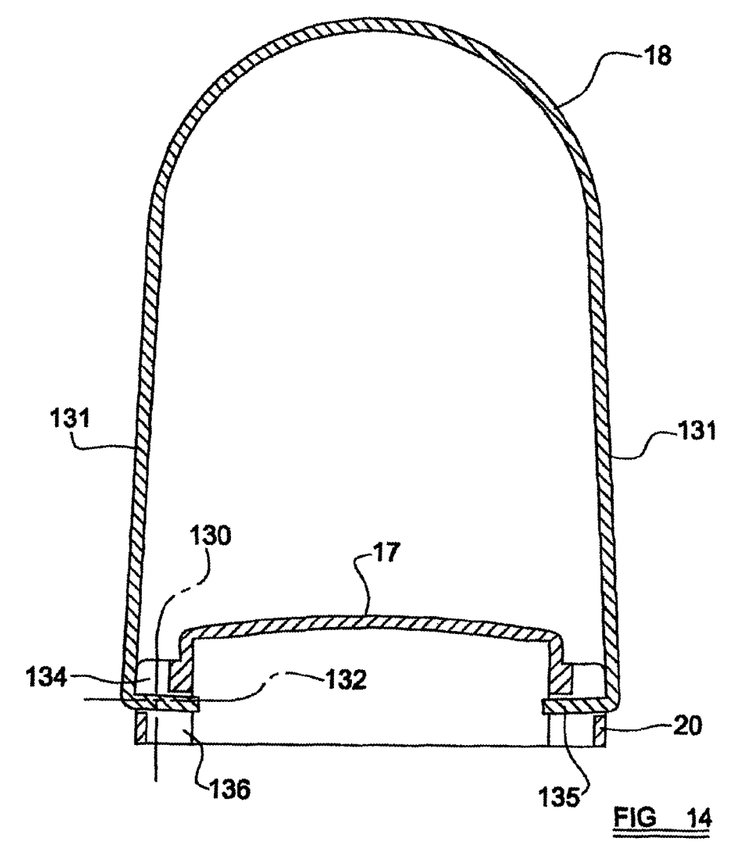
FIG. 14 is a cross-sectional view showing how the ends of the handle are inserted into the lid.
Figure 15:
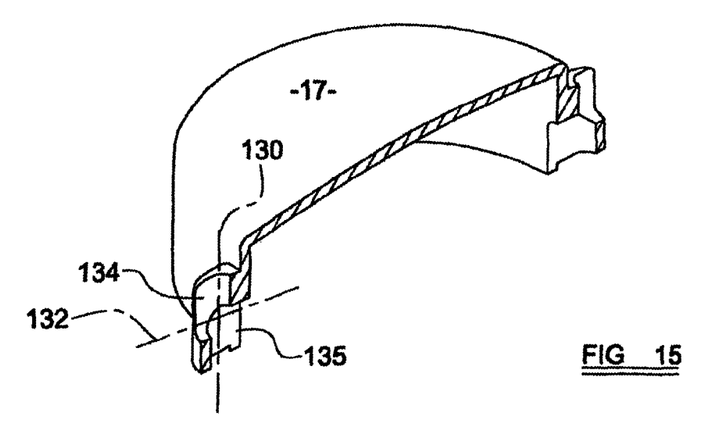
FIG. 15 is a perspective view partly in section of the lid.

Turning now to FIGS. 13 to 15, it can be seen that the two lugs 20 each have formed through them bores 130, 132 intersecting at right angles, the bore 130 being parallel to the cylindrical axis of the container (i.e. vertical in use) and the bore 132 extending radially relative to that axis (i.e. horizontal in use) when the lid is in position as shown in FIG. 1.

As can best be seen in FIG. 15, the part of the cylindrical bore 130 above the junction with bore 132 opens radially outwardly at 134, and the part of the vertical bore below the junction with bore 132 opens radially inwardly, to allow the insertion of the inwardly turned ends 135 of the wire handle 18. As can be seen in FIG. 14, these ends 135 can be pre-bent to insert the handle through the lid. The ends 135 are pulled apart and inserted into the horizontal bores 132 until the two legs of the handle are aligned in the vertical bores 130. This is allowed by the radially outward openings 134 of bore 130.

With the legs of the lid aligned in vertical bores 130, the radially inward openings 136 enable the legs and their inwardly turned ends to be pushed downwards through the lid to the position shown in FIG. 13, so that the ends 135 of the handle can be inserted into bores 138 in the support member 25 of the feeder. This can be done by pulling the legs of the handle apart below the lid and inserting them into bores 138, pushing the lid down onto the upper end of the container then effectively locks the ends 135 in the bores 138. When the lid is raised to fill the container, the handle can be pivoted so that the lid is clear of the open top of the container, the ends 135 remaining in position owing to the resilience of the handle.

The arrangement shown, the lid 17, typically of moulded plastics material, the wire handle 18 and the other parts of the container can be supplied separately for use. The inwards bending of the ends 135 requires considerable precision to align them coaxially, can be done when the handle is made so that no particular skill is required to assemble the parts of the container.

The invention claimed is:

1. A handle and lid combination for a container, comprising a handle with two parallel legs of resilient material connected together at their upper ends, their lower ends being bent towards one another at right angles to align with one another on a common axis and a lid with upper and lower sides and two vertical bores formed therethrough on opposite sides of the lid and respective horizontal bores in said lid, each intersecting one of said vertical bores at right angles and said horizontal bores being coaxially aligned with one another, wherein an upper part of each vertical bore, above its junction with the horizontal bore, also extends radially outwardly to the periphery of the lid and the lower part of each bore, below its junction with the horizontal bore, opens radially inwardly to the inside of the lid, whereby the resilient legs of the handle when pulled apart enable the turned-in legs to enter the respective horizontal bores on opposite sides of the lid and can be pushed together until the resilient leg extends within respective vertical bores, the lower openings of the vertical bores thereafter enabling the handle to be pushed downwardly through the lid to allow the inwardly turned portions of the legs subsequently to be received into corresponding opposed bores in an upper part of the container to form a pivoting handle with the lid retained thereon.

2. A handle and lid combination according to claim 1 wherein the handle is formed from a single length of wire bent into an arcuate upper end with two parallel legs having said inwardly turned ends.

3. A handle and lid combination according to claim 1 wherein the inwardly turned lower ends of the legs extend towards each other for a distance of 1 to 1.5 cm.

4. A bird feeder comprising a tubular container for bird food and a handle and lid combination for said container, said tubular container having a pair of diametrically opposed apertures in a wall thereof at its upper end and said handle and lid combination comprising a handle with two parallel legs of resilient material connected together at their upper ends, their lower ends being bent towards one another at right angles to align with one another on a common axis and a lid with upper and lower sides and two vertical bores formed therethrough on opposite sides of the lid and respective horizontal bores in said lid, each intersecting one of said vertical bores at right angles and said horizontal bores in said lid, each intersecting one of said vertical bores at right angles and said horizontal bores being coaxially aligned with one another, wherein an upper part of each vertical bore, above its junction with the horizontal bore, also extends radially outwardly to the periphery of the lid and the lower part of each bore, below its junction with the horizontal bore, opens radially inwardly to the inside of the lid, whereby the resilient legs of the handle when pulled apart enable the turned-in legs to enter the respective horizontal bores on opposite sides of the lid and can be pushed together until the resilient leg extends within respective vertical bores, the lower openings of the vertical bores thereafter enabling the handle to be pushed downwardly through the lid to allow the inwardly turned portions of the legs subsequently to be received into said diametrically opposed apertures in the upper part of the container to form a pivoting handle with the lid retained thereon.

5. A bird feeder according to claim 4 having a removable base engageable with projections at a lower end of the container, the base comprising an upper part shaped and dimensioned to close the lower end of the container and having a plurality of slots in which said projections engage when the upper part and the container are fitted together, and a lower part engageable with the upper part and including a locking mechanism whereby the projections can be locked into said slots by rotation of the lower part of the base relative to the upper part, between a first rotational position in which the projections can be disengaged from the slots and a second rotational position in which the projections are locked into the slots, wherein the upper and lower parts of the base can be separated from one another with a further relative rotation of said upper and lower parts between said first position, in which the two parts are locked together, and a third position in which they are disengaged.

6. A feeder according to claim 5 wherein the container is cylindrical in shape.

7. A feeder according to claim 5 wherein the upper part of the base is in the form of a plug whose outer periphery matches the inner periphery of the container.

8. A feeder according to claim 5 wherein the projections at the lower end of the container comprise a pair of diametrically opposed projections extending towards one another from opposite sides of the container wall.

9. A feeder according to claim 8 wherein said projections are formed on port members fitted to the lower end of the container.

10. A feeder according to claim 8 wherein the lower base part has a pair of locking flanges which in said second rotational position extend above said projections to retain them in said slots.

11. A feeder according to claim 5 wherein the upper base part has a substantially circular bottom surface and the lower base part comprises an outer ring with a plurality of radially inwardly projecting flanges with coplanar top surfaces to support the upper member.

12. A feeder according to claim 5 wherein the upper base part has two or more downwardly projecting engaging members with lateral projections which in said first position engage under corresponding projections of the lower base part to lock the two base parts together and which in said third position are disengaged, allowing the upper and lower base parts to be separated.

13. A feeder according to claim 5 wherein as the upper and lower base parts are rotated relative to one another a resilient stop member on one of said upper and lower base parts snaps into a corresponding recess in each of said first, second and third rotational positions.

14. A feeder according to claim 5 wherein an axial cylindrical projection is provided on one of said upper and lower base parts and a corresponding circular aperture on the other to centre said base part for engagement, said projection and aperture being coaxial with a central axis of the feeder.

15. A bird feeder according to claim 5 further comprising at least one pair of diametrically opposed apertures in the tubular container and a pair of feeding port members shaped and dimensioned to fit into said aperture and to engage one another in a central part of the container to define between them an aperture for a retaining pin to hold said port members in position, wherein said port members are shaped to interlock when moved towards one another in a straight line, said interlocking being such as to prevent any twisting movement between them or any relative movement transverse to said straight line, each said port member having a surface defining a straight open channel such that when the port members are in their interlocked position said surfaces abut one another and said channels define between them a hole through which said retaining pin may be inserted to lock said port members together.

16. A feeder according to claim 15 wherein said surface on each of the port members is positioned to coincide with a central plane of the port member, the channel formed therein being vertical when the port member is in position in the feeder.

17. A feeder according to claim 16 wherein said surface is formed on a shank extending from a main body portion of the port member, the shank having a projection extending parallel to said plane on the end of the shank remote from said main body portion, and wherein each said port member has, adjacent said surface on the opposite side of said central plane, a recess in the main body portion so that when the two port members interlock the projection on one port member is received into the corresponding recess of the other.

18. A bird feeder according to claim 4 further comprising a rigid tubular support extending between said diametrically opposed apertures in said container wall, said support having reduced diameter sections at each end to protrude through the opposed apertures and receive the ends of the bent in sections of the legs.

\* \* \* \* \*